(12) United States Patent
Ramarge et al.

(10) Patent No.: US 6,840,432 B1
(45) Date of Patent: Jan. 11, 2005

(54) SOLDER APPLICATION TECHNIQUE

(75) Inventors: Michael M. Ramarge, Olean, NY (US); David P. Bailey, Portville, NY (US); Thomas C. Hartman, Allegany, NY (US)

(73) Assignee: McGraw-Edison Company, Houston, TX (US)

(*) Notice: Subject to any disclaimer, the term of this patent is extended or adjusted under 35 U.S.C. 154(b) by 0 days.

(21) Appl. No.: 10/419,071

(22) Filed: Apr. 21, 2003

Related U.S. Application Data

(62) Division of application No. 09/873,335, filed on Jun. 5, 2001, now Pat. No. 6,575,355, which is a division of application No. 09/570,404, filed on May 12, 2000, now Pat. No. 6,279,811.

(51) Int. Cl.$^7$ ............................. B23K 1/20; B23K 31/02
(52) U.S. Cl. .................... 228/208; 228/124.5; 228/190; 228/223; 228/260; 228/261
(58) Field of Search ............................. 228/121, 122.1, 228/123.1, 124.1, 124.5, 190, 208, 209, 210, 212, 223, 225, 226, 256, 260, 261; 427/446, 455, 456, 123, 126.1

(56) References Cited

U.S. PATENT DOCUMENTS

| | | | |
|---|---|---|---|
| 2,586,285 A | | 2/1952 | Ackermann |
| 2,593,955 A | | 4/1952 | Ackermann |
| 3,328,631 A | | 6/1967 | Greber |
| 3,903,494 A | | 9/1975 | May |
| 3,979,043 A | * | 9/1976 | Lowery ...................... 228/205 |
| 4,100,588 A | | 7/1978 | Kresge |
| 4,286,743 A | | 9/1981 | Vasseur et al. |
| 4,296,002 A | | 10/1981 | Sokoly et al. |
| 4,316,171 A | | 2/1982 | Miyabayshi et al. |
| 4,352,140 A | | 9/1982 | Axelsson et al. |
| 4,423,404 A | * | 12/1983 | Goedde et al. ................ 338/21 |
| 4,427,843 A | | 1/1984 | Ishihara et al. |
| 4,444,351 A | * | 4/1984 | Dries et al. .................. 228/121 |
| 4,448,806 A | | 5/1984 | Levinson |
| 4,476,513 A | | 10/1984 | Stenström |
| 4,538,347 A | | 9/1985 | Palilla et al. |
| 4,656,555 A | | 4/1987 | Raudabaugh |
| 4,729,053 A | | 3/1988 | Maier et al. |
| 4,816,959 A | | 3/1989 | Maier et al. |
| 4,825,188 A | | 4/1989 | Parraud et al. |
| 4,833,438 A | | 5/1989 | Parraud et al. |
| 4,851,955 A | | 7/1989 | Doone et al. |
| 4,930,039 A | | 5/1990 | Woodworth et al. |
| 4,992,906 A | | 2/1991 | Doone et al. |
| 5,003,689 A | | 4/1991 | Doone et al. |

(List continued on next page.)

FOREIGN PATENT DOCUMENTS

| | | | | |
|---|---|---|---|---|
| DE | 33 34 533 | | 4/1985 | |
| GB | 2 048 116 | | 12/1980 | |
| WO | WO 97/32382 | | 9/1997 | |
| WO | WO 99/18642 | | 4/1999 | |
| WO | WO 99/37434 | * | 7/1999 | ............ B23K/1/00 |

Primary Examiner—Stanley S. Silverman
Assistant Examiner—Colleen P. Cooke
(74) Attorney, Agent, or Firm—Fish & Richardson P.C.

(57) ABSTRACT

A method of joining an end face of a first electric component to an end face of a second electric component includes applying a first metal layer to the end face of the first electric component to form a first metallized layer and applying a second metal layer to the end face of the second electric component to form a second metallized layer. A first fusible alloy layer is applied to the first metallized layer by melting a fusible alloy and propelling the melted fusible alloy onto the first metallized layer, and a second fusible alloy layer is applied to the second metallized layer by melting a fusible alloy and propelling the melted fusible alloy to the second metallized layer. The method further includes contacting the first fusible alloy layer to the second fusible alloy layer. Next, the end faces and fusible alloy layers are heated to melt the fusible alloy layers. After heating, the end faces and fusible alloy layers are cooled to form a bond between the end faces.

14 Claims, 6 Drawing Sheets

U.S. PATENT DOCUMENTS

| | | | |
|---|---|---|---|
| 5,113,306 A | 5/1992 | Veverka et al. | |
| 5,138,517 A | 8/1992 | Raudabaugh | |
| 5,159,158 A | 10/1992 | Sakich et al. | |
| 5,159,748 A | 11/1992 | Doone et al. | |
| 5,210,676 A | 5/1993 | Mashikian | |
| 5,214,249 A | 5/1993 | Goch et al. | |
| 5,218,508 A | 6/1993 | Doone | |
| 5,268,045 A | 12/1993 | Clare | |
| 5,291,366 A | 3/1994 | Giese et al. | |
| 5,322,205 A | * 6/1994 | Kato et al. | 228/110.1 |
| 5,336,852 A | 8/1994 | Goch et al. | |
| 5,340,015 A | * 8/1994 | Hira et al. | 228/205 |
| 5,363,266 A | 11/1994 | Wiseman et al. | |
| 5,497,138 A | 3/1996 | Malpiece et al. | |
| 5,500,996 A | * 3/1996 | Fritsch et al. | 29/612 |
| 5,526,977 A | * 6/1996 | Wei | 228/208 |
| 5,594,613 A | 1/1997 | Woodworth et al. | |
| 5,602,710 A | * 2/1997 | Schmidt et al. | 361/127 |
| 5,608,597 A | 3/1997 | Holmström et al. | |
| 5,625,523 A | 4/1997 | Nedriga | |
| 5,652,690 A | 7/1997 | Mansfield et al. | |
| 5,680,289 A | 10/1997 | Robinson et al. | |
| 5,695,841 A | 12/1997 | Mazeika et al. | |
| 5,708,555 A | 1/1998 | Woodworth et al. | |
| 5,712,757 A | 1/1998 | Bennett et al. | |
| 5,724,221 A | * 3/1998 | Law | 361/127 |
| 5,757,604 A | 5/1998 | Bennett et al. | |
| 5,818,677 A | 10/1998 | Bennett et al. | |
| 5,830,405 A | 11/1998 | Mazeika et al. | |
| 5,894,053 A | 4/1999 | Fried | |
| 5,896,266 A | 4/1999 | Rubinski | |
| 5,912,611 A | 6/1999 | Berggren et al. | |
| 5,930,102 A | 7/1999 | Rook | |
| 5,936,824 A | 8/1999 | Carpenter, Jr. | |
| 5,936,825 A | 8/1999 | DuPont | |
| 5,936,826 A | 8/1999 | Schmidt | |
| 5,959,822 A | 9/1999 | Bock et al. | |
| 5,964,395 A | * 10/1999 | Glovatsky et al. | 228/123.1 |
| 6,008,975 A | * 12/1999 | Kester et al. | 361/117 |
| 6,008,977 A | 12/1999 | Thatcher | |
| 6,238,199 B1 | * 5/2001 | Schallenmueller et al. | 425/401 |
| 6,396,676 B1 | 5/2002 | Doone et al. | |
| 6,519,129 B1 | * 2/2003 | Ramarge et al. | 361/117 |

* cited by examiner

| Surfacing or Metallizing Materials |
|---|
| Silicon Aluminum - 12%
Silicon Aluminum - 6%
Silicon Aluminum - 6%
Tin Zinc
Tin
Babbitt
Nickel Aluminum Molybdenum
Nickel Chrome - 80/20
Nickel
Aluminum Bronze
Nickel Chrome Aluminum
Molybdenum
Titanium
Silicon Bronze
Bronze Micromatrix-Composite™
Iron Chrome Aluminum
Carbon Steel - Medium
Carbon Steel - High Micromatrix-Composite™
Carbon Steel - High
TAFALOY® Nickel Chrome
Stainless 18/5
Chrome Steel - 13%
Monel
TAFALOY® Nickel Chrome Moly
High Purity Nickel Chrome Iron
Nickel Chrome Aluminum Micromatrix-Composite™
Nickel Aluminum Molybdenum Micromatrix-Composite™
Bond Arc®
Nickel Chrome Aluminum Yittrium Micromatrix-Composite™
Nickel Chrome Iron
Stainless 18/8
UltraMachinable Stainless
Iron Nickel Chrome Micromatrix-Composite™
UltraHard™
TAFALOY® Moldmaking |

*FIG. 5D*

SOLDER APPLICATION TECHNIQUE

CROSS-REFERENCE TO RELATED APPLICATIONS

This application is a divisional application of U.S. application Ser. No. 09/873,335, filed Jun. 5, 2001, now U.S. Pat. No. 6,575,355; which is a divisional application of U.S. application Ser. No. 09/570,404, filed May 12, 2000, now U.S. Pat. No. 6,279,811, all of which are incorporated by reference.

BACKGROUND

Electrical transmission and distribution equipment is subject to voltages within a fairly narrow range under normal operating conditions. However, system disturbances, such as lightning strikes and switching surges, may produce momentary or extended voltage levels that greatly exceed the levels experienced by the equipment during normal operating conditions. These voltage variations often are referred to as over-voltage conditions.

If not protected from over-voltage conditions, critical and expensive equipment, such as transformers, switching devices, computer equipment, and electrical machinery, may be damaged or destroyed by over-voltage conditions and associated current surges. Accordingly, it is routine practice for system designers to use surge arresters to protect system components from dangerous over-voltage conditions.

A surge arrester is a protective device that is commonly connected in parallel with a comparatively expensive piece of electrical equipment so as to shunt or divert over-voltage-induced current surges safely around the equipment, thereby protecting the equipment and its internal circuitry from damage. When exposed to an over-voltage condition, the surge arrester operates in a low impedance mode that provides a current path to electrical ground having a relatively low impedance. The surge arrester otherwise operates in a high impedance mode that provides a current path to ground having a relatively high impedance. The impedance of the current path is substantially lower than the impedance of the equipment being protected by the surge arrester when the surge arrester is operating in the low-impedance mode, and is otherwise substantially higher than the impedance of the protected equipment.

When the over-voltage condition has passed, the surge arrester returns to operation in the high impedance mode. This high impedance mode prevents normal current at the system frequency from flowing through the surge arrester to ground.

Conventional surge arresters typically include an elongated outer enclosure or housing made of an electrically insulating material, a pair of electrical terminals at opposite ends of the enclosure for connecting the arrester between a line-potential conductor and electrical ground, and an array of other electrical components that form a series electrical path between the terminals. These components typically include a stack of voltage-dependent, nonlinear resistive elements, referred to as varistors. A varistor is characterized by having a relatively high impedance when exposed to a normal system frequency voltage, and a much lower resistance when exposed to a larger voltage, such as is associated with over-voltage conditions. In addition to varistors, a surge arrester also may include one or more spark gap assemblies electrically connected in series or parallel with one or more of the varistors. Some arresters also include electrically conductive spacer elements coaxially aligned with the varistors and gap assemblies.

For proper arrester operation, contact must be maintained between the components of the stack. To accomplish this, it is known to apply an axial load to the elements of the stack. Good axial contact is important to ensure a relatively low contact resistance between the adjacent faces of the elements, to ensure a relatively uniform current distribution through the elements, and to provide good heat transfer between the elements and the end terminals.

One way to apply this load is to employ springs within the housing to assure the stacked elements engage with one another. Another way to apply the load is to wrap the stack of arrester elements with glass fibers so as to axially-compress the elements within the stack.

Another way to assure adequate contact between components of the stack is to bond them to one another by various techniques. Components of the stack may be bonded together using a bonding technique that includes applying a preform or coil of solder between components to be bonded. In some implementations, the face of a component is attached directly to another surface by, for example, soldering or brazing directly to the surface.

The use of high temperature solders or brazing may require more aggressive fluxes when heated in air. Also, a secondary heat treatment of the varistors may be required to restore desired properties. Problems associated with high temperature solders or brazing in air may be avoided by heating in a reducing atmosphere. However, the reducing atmosphere may have an unrecoverable adverse effect on varistor properties.

When using solder, it is desirable to use low temperature solders, so as to avoid heating the MOV disks to temperatures that can damage the disks. This also tends to allow the use of less aggressive fluxes, which reduces the potential attack on the bond between components.

A potential problem associated with using low temperature solders is that, in some cases, the solder temperature (for example, 221° Celsius) can approach the operating temperature of the device (for example, 200° Celsius), which can lead to partial melting of the solder and potential device failure under extreme operating conditions. This problem may be avoided by selecting a solder having a solder temperature that differs sufficiently from the operating temperature, while not being too high.

Other techniques for attaching electrical components include the use of an organic adhesive, such as a metal-filled epoxy; an inorganic adhesive; or brazes. Each of the above techniques can be performed with or without metallized faces being deposited on surfaces of the components.

Bonding between the faces or surfaces of adjacent MOVs has typically been achieved using aggressive fluxes between the base metal applied to the MOV and a preform or a coil of solder. The fluxes are used in this case to prevent oxidation during the heating processes and also to clean or remove any dust or other contaminants on the surface to be bonded. However, the application of flux to a surface results in a porosity of the surface, due to the formation of voids or discontinuities in the surface. Furthermore, with the use of flux, a flux residue is often left under the solder. Both the increased porosity and the flux residue can potentially weaken the bond between the surfaces of elements in the stack.

SUMMARY

In accordance with one general aspect of the invention, a method of joining an end face of a first electric component to an end face of a second electric component includes applying a first metal layer to the end face of the first electric component to form a first metallized layer on the end face of the first electric component. The method further includes applying a first fusible alloy layer to the first metallized layer by melting the fusible alloy and propelling the melted fusible alloy onto the first metallized layer. The method includes applying a second metal layer to the end face of the second electric component to also form a second metallized layer on the second electric component's end face, and applying a second fusible alloy layer to the second metallized layer by melting the fusible alloy and propelling the melted fusible alloy onto the second metallized layer. Next, the fusible alloy layers are contacted together and the end faces and fusible alloys are heated under a compressive force to melt the fusible alloy layers. Finally, the end faces and fusible alloy layers are cooled to form a bond between the end faces.

Embodiments may include one or more of the following features. For example, one or more of the electric components may be a varistor, such as a metal oxide varistor, a terminal, a spacer, a gap assembly, a thermistor, a thyristor, or a capacitor.

The fusible alloy may be melted by electrically charging two consumable elements of the fusible alloy, and generating an electrical arc between the elements to heat and melt the consumable elements. A fusible alloy may be propelled onto a metallized layer by atomizing the melted fusible alloy using a compressed gas jet that transports the atomized fusible alloy to the metallized layer. A fusible alloy also may be melted by combusting or creating a plasma that heats and melts the fusible alloy.

A metal layer may be applied to an end face by melting the metal and propelling the melted metal to the end face.

The fusible alloys may melt between around 150 and 600° Celsius, and more particularly around 220 to 250° Celsius. The fusible alloy layers may be applied to the metallized layers without the use of a flux. The metal layers may include brass, copper, aluminum, or zinc. The melting point of the metal layers may be between around 550° Celsius and 1200° Celsius.

The first fusible alloy layer may be contacted to the second fusible alloy layer by applying pressure to a second set of end faces of the electric components, the second set of end faces being on opposite sides from the end faces to be joined. The end face and fusible alloy layers may be heated to about 235° Celsius.

In accordance with another general aspect of the invention, a method of applying a fusible alloy layer to an end face of an electric component includes applying a metal layer to the end face of the electric component to form a metallized layer on the end face of the electric component. The method further includes applying a fusible alloy layer to the metallized layer by melting the fusible alloy and propelling the melted fusible alloy to the metallized layer.

Embodiments may include one or more of the features noted above.

The method of soldering and joining components eliminates the need for using aggressive fluxes on the metallized surface to prevent an oxidation layer from forming on the metallized surface when heated. The method produces a more homogeneous, lower porosity joint or bond due to uniform coating thickness, and eliminates flux and flux residue between the metallized layer and the fusible alloy.

Manufacturing costs are reduced because the flux application is eliminated and the process of joining the components is simplified. For example, a preform or coil of solder, which is often used to bond components together, need not be centered between the components to be joined.

The details of one or more embodiments of the invention are set forth in the accompanying drawings and the description below. Other features, objects, and advantages of the invention will be apparent from the description and drawings, and from the claims.

DESCRIPTION OF THE DRAWINGS

FIG. 5D is a table of possible surfacing materials.

Like reference symbols in the various drawings indicate like elements.

DETAILED DESCRIPTION

Figure 2:
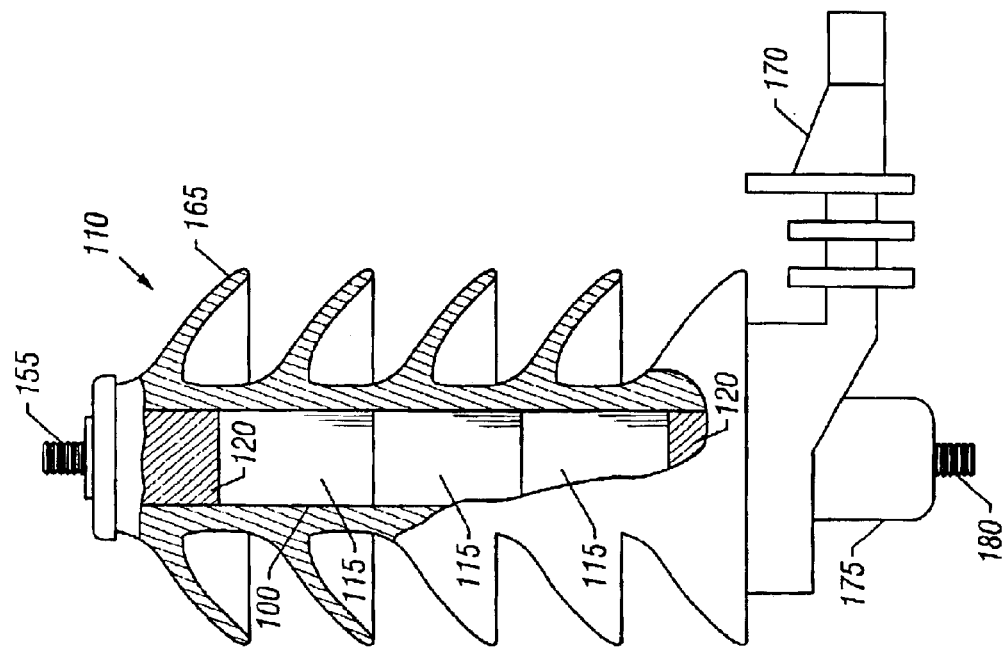
FIG. 2 is a partial cross-sectional view of a surge arrester employing the module of FIG. 1.
Figure 1:
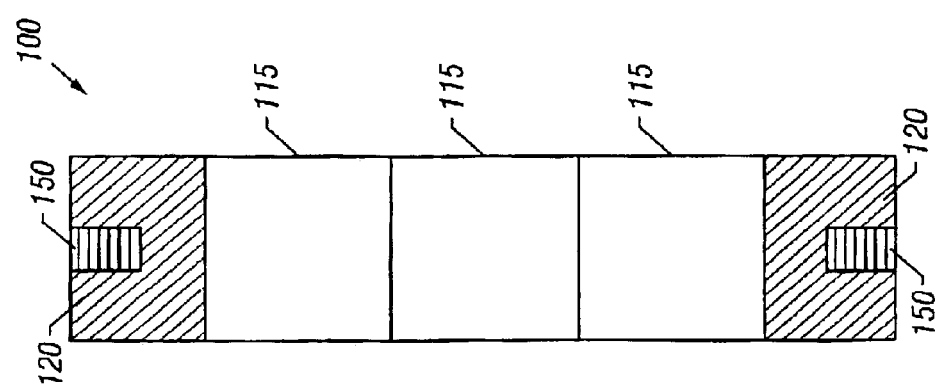
FIG. 1 is a cross-sectional view of an electrical component module.

Referring to FIGS. 1 and 2, an electrical component module includes a bonded element stack 100 that serves as both the electrically-active component and the mechanical support component of a surge arrester 110. The stack 100 also exhibits high surge durability, in that it can withstand high current, short duration conditions, or other required impulse duties. For example, an implementation of the stack for use in heavy duty distribution arresters has proven capable of withstanding 100 kA pulses having durations of 4/10 microseconds, where 4/10 indicates that a pulse takes 4 microseconds to reach 90% of its peak value and 10 microseconds more to get back down to 50% of its peak value.

Elements of the bonded element stack 100 are stacked in an end-to-end relationship and bonded together at their end surfaces. Since the elements of the stack 100 are affirmatively bound together, the arrester 110 does not need to include a mechanism or structure for applying an axial load to the elements.

The surge arrester 110 may be implemented as a distribution class surge arrester, such as a 10 kA heavy duty 10 kV (8.4 kV Maximum Continuous Operating Voltage) arrester. It should be understood, however, that the stack 100 may be used in other types of surge arresters, and in other electrical protective equipment.

The bonded element stack 100 may include different numbers of elements, and elements of different sizes or types. Examples include varistors, capacitors, thyristors, thermistors, resistors, terminals, spacers, and gap assemblies. For purposes of explanation, the stack is shown as including three metal oxide varistors ("MOVs") 115 and a pair of terminals 120.

Figure 3:
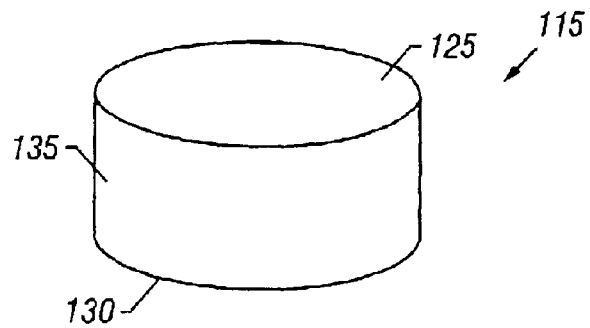
FIG. 3 is a perspective view of a MOV device of the module of FIG. 1.

Referring also to FIG. 3, each MOV 115 is made of a metal oxide ceramic formed into a short cylindrical disk having an upper face 125, a lower face 130, and an outer cylindrical surface 135. The metal oxide used in the MOV 115 may be of the same material used for any high energy, high voltage MOV disk, such as a formulation of zinc oxide.

The MOVs may be sized according to the desired application. For example, in one set of implementations, the MOV may have a diameter between approximately 1 to 3 inches, such that the upper and lower faces 125, 130 each have surface areas of between about 0.785 and 7.070 square inches.

Given a particular metal oxide formulation and a uniform or consistent microstructure throughout the MOV, the thickness of the MOV determines the operating voltage level of the MOV. In one implementation, each MOV is about 0.75 inches thick. In some implementations, this thickness may be increased substantially (e.g., tripled).

It is desirable to minimize the cross-sectional areas of the MOVs so as to minimize the size, weight and cost of the arrester. However, the durability and recoverability of the MOVs tend to be directly related to the sizes of the MOVs. In view of these competing considerations, MOVs having diameters of approximately 1.6 inches have been used.

The upper and lower faces 125, 130 may be metallized using, for example, sprayed-on coatings of molten aluminum or brass. In some implementations, these coatings have thicknesses of approximately 0.002 to 0.010 inches. The outer cylindrical surface 135 is made up of the metal oxide formulation. In other implementations, the surface 135 may be covered by an insulative collar.

A terminal 120 is disposed at each end of the stack 100. Each terminal 120 is a relatively short, cylindrical block formed from a conductive material, such as, for example, aluminum. Each terminal 120 has a diameter substantially equal to that of an MOV 115. In some implementations, each terminal may also include a threaded bore 150 in which may be positioned a threaded conductive stud 155.

In general, the terminals 120 may be thinner than terminals associated with modules that, for example, are wrapped with a structural layer to provide an axial load on the components of the module. This reduced thickness may result from changes in the geometry of the device, or simply because thicker metal is not needed for bonding with the structural layer.

As shown in FIG. 2, the surge arrester 110 includes the bonded element stack 100, a polymeric housing 165, and an arrester hanger 170. The stack 100 is disposed within the polymeric housing 165. An insulating or dielectric compound (not shown), such as room temperature vulcanized silicone, may be used to fill any voids between the stack 100 and the inner surface 175 of the housing 165. A threaded conductive stud 155 is disposed in the bore 150 of each terminal 120. The upper stud 155 extends through the housing 165 and includes threads for engaging a terminal assembly (not shown). The lower stud 155 extends through an aperture (not shown) in hanger 170 for connection to a ground lead disconnector 175. A threaded stud 180 extends from the disconnector 175 to engage a ground lead terminal assembly (not shown). The housing 165 is sealed about the upper and lower ends of the stack 100.

Elements of the bonded element stack 100 are bonded together at their end surfaces, such that the stack 100 serves as both the electrically-active component and the mechanical support structure of an electrical protective device such as the surge arrester 110. This bonding may involve ceramic-to-ceramic bonding between, for example, faces of adjacent MOVs; ceramic-to-metal bonding between, for example, an MOV and a terminal; and metal-to-metal bonding between, for example, a terminal and a component having a metal face, such as a spark gap assembly. The bonding must provide bonds that are both mechanically stable and electrically conductive.

Figure 4:
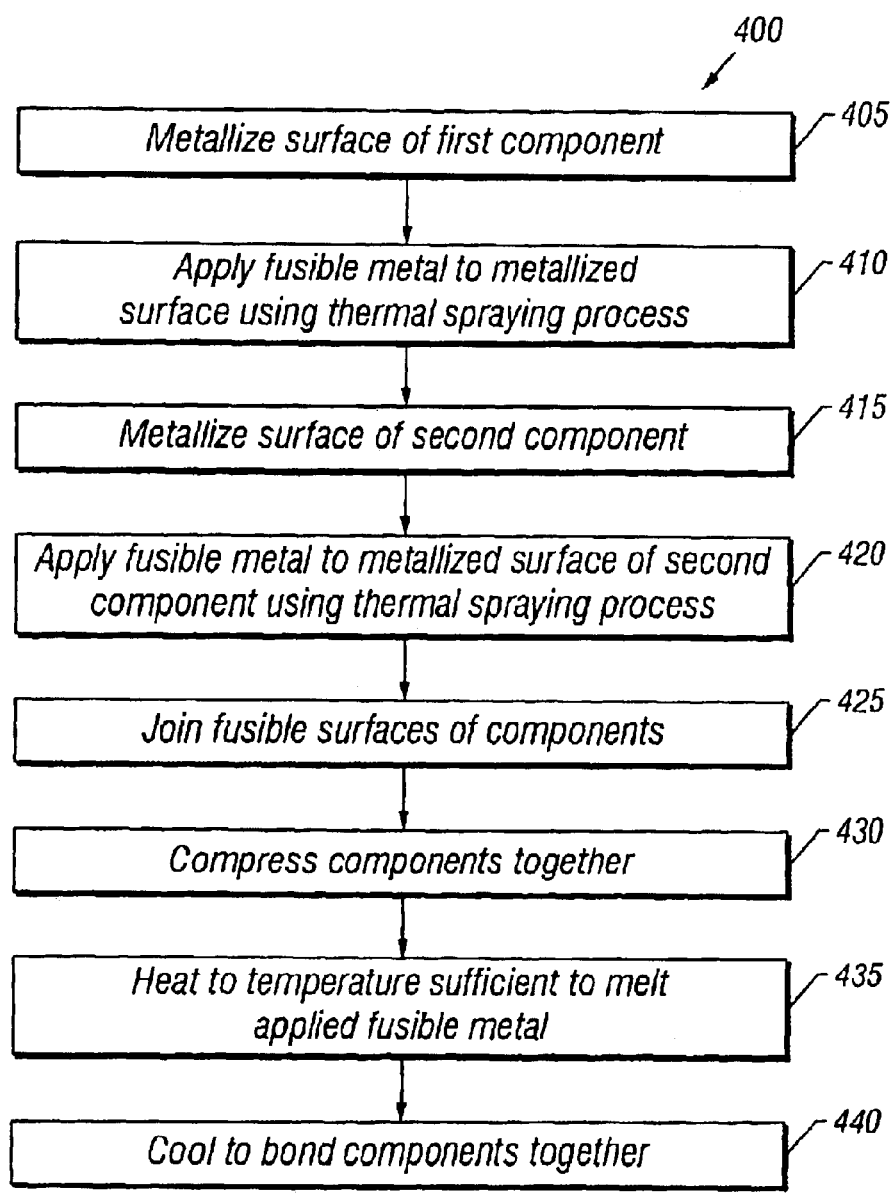
FIGS. 4 and 6 are flow charts of procedures for use in bonding components of an electrical component module.
Figure 5A:
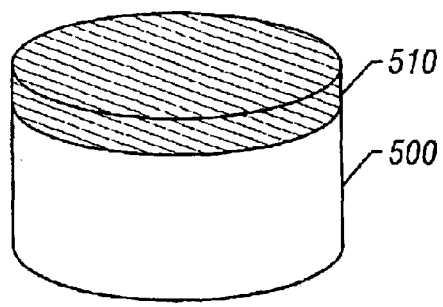
FIGS. 5A and 5B are perspective views of preparing the components to be bonded according to the procedure of FIG. 4.
Figure 5B:
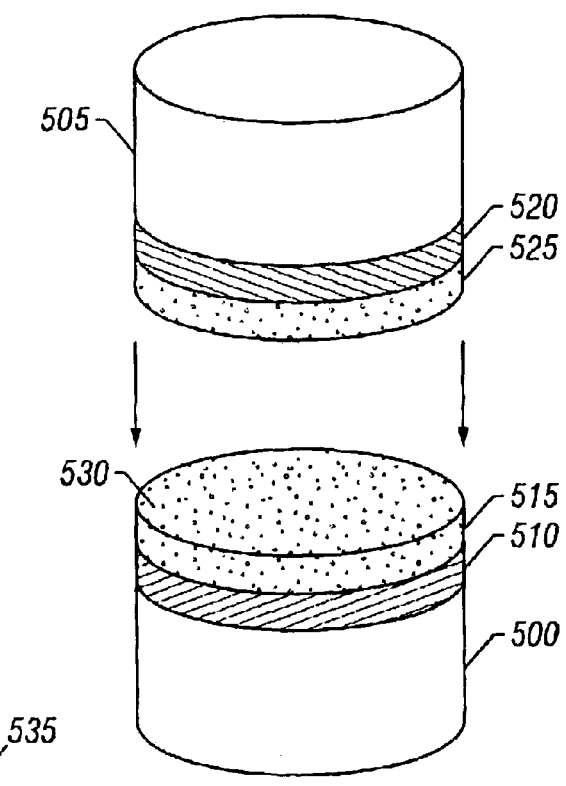
Figure 5C:
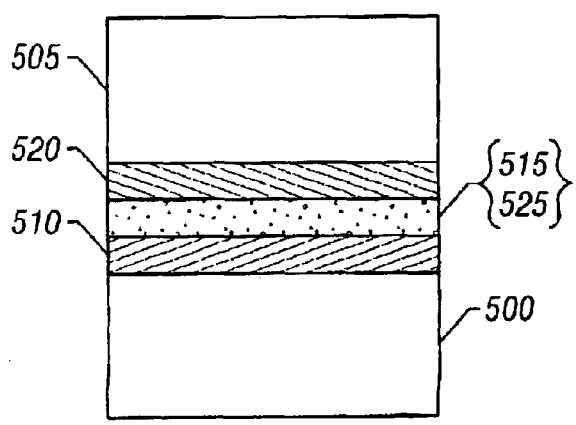
FIG. 5C is a cross-sectional view of a bonded component stack.

Referring to FIG. 4, bonding between a surface on a first component 500 (for example, the face of an MOV 115) and the surface of second component 505 (for example, the face of a terminal or the face of another MOV) may be achieved according to a procedure 400 as illustrated in FIGS. 5A–5C. Initially, the MOV face of the first component 500 to be bonded is metallized (step 405) by applying a thin layer of a surfacing material 510 with a relatively high melting point (that is, around 1100° C.). The melting temperature of the surfacing material is sufficiently greater than a melting point of a fusible alloy to be subsequently applied to the surfacing material layer. Therefore, the melting point of the surfacing material 510 may be between around 550° C. and 1200° C.

Surfacing materials with the above described properties include brass, copper, or other metals with similar melting points. For example, other surfacing materials include aluminum and aluminum alloys, zinc and zinc alloys, and zinc and aluminum alloys. Other surfacing materials are listed in a table 550 shown in FIG. 5D.

The thin layer of surfacing material typically has a thickness of approximately 0.002 to 0.010 inches. Application of the thin layer of metal 510 uses a process referred to as flame spraying. Flame spraying is a thermal spraying process in which a gas flame (for example, an oxyfuel flame) is used as a source of heat for melting the surfacing material, which, in this case, is the brass or metal 510. A compressed gas such as air may be used for atomizing and propelling the surfacing material onto the surface of the first component 500. In general, the gas to be used should be one unlikely to contribute to oxidation on the surface of the first component 500.

Arc spraying and plasma spraying are other suitable thermal spraying processes. In arc spraying, an arc between two consumable forms (for example, electrodes, wires, powders, gases, or solutions) of the surfacing material is generated to provide the heat source to melt the surfacing material. Typically, wires, which serve as electrodes, are fed through a gun that electrically charges and directs the wires to make contact with each other, thus melting the wires by arc discharge. An air jet then sprays or propels the melted surfacing material onto the surface of the first component 500. In plasma spraying, a nontransferred arc is utilized as the source of heat that ionizes a gas which then melts and propels or sprays the surfacing material onto the surface of the first component 500.

After the metallized layer is applied to the surface of the first component 500 using flame spraying, a fusible alloy or solder 515 is applied to the metallized layer (step 410) using a thermal spraying technique, as discussed above. In some implementations, arc spraying may be used because of the ease associated with handling the electrodes.

The fusible alloy melts at a relatively low temperature, for example 150–600° C., and preferably melts between around 220 and 250° C. The fusible alloy selected has a melting temperature lower than the melting temperature of the surfacing material to prevent melting of the metallized layer when the fusible alloy is heated to form the bond between components. Suitable fusible alloys include alloys of tin and lead or tin and silver.

The fusible alloy may be applied at any time to the metallized layer though care should be taken to avoid oxidation of the metallized surface. For example, the fusible alloy may be applied immediately following application of the metallized layer. Alternatively, the fusible alloy may be applied several minutes or hours after application of the metallized layer.

The metallization and fusible alloy processes that were completed for the first component 500 are repeated for the second component 505. That is, a metallized layer 520 is applied to a surface of the second component 505 using a thermal spraying technique described above (step 415). Then, a fusible alloy or solder 525 is applied to the metallized layer 520 of the second component 505 (step 420) using a thermal spraying technique.

Next, a surface 530 of the fusible alloy 515 of the first component 500 is joined with a surface of the fusible alloy 525 of the second component 505 (step 425). Pressure is preferably applied between the first component 500 and the second component 505 at this point to keep the components together for the next step in the process 400 (step 430). The pressure applied to the end faces of the components to be bonded may be between about 25 and 100 pounds per square inch. Because each component to be bonded has already been prepared by metallizing and soldering the surface as discussed above, a component need not be joined with the other component immediately following the fusible alloy application step. For example, the first component 500 may be bonded with the second component 505 in a separate process at a different time and location from the metallizing and soldering application steps for each component.

Once the first component 500 is joined with the second component 505 (step 430), the joined components are heated to melt the applied fusible alloy (step 435). For example, in one implementation, the stack is heated to about 235° C. for about an hour. The stack then is cooled to bond the components together at the fusible alloy layers 515, 525 (step 440) into a bonded stack 535.

Figure 6:
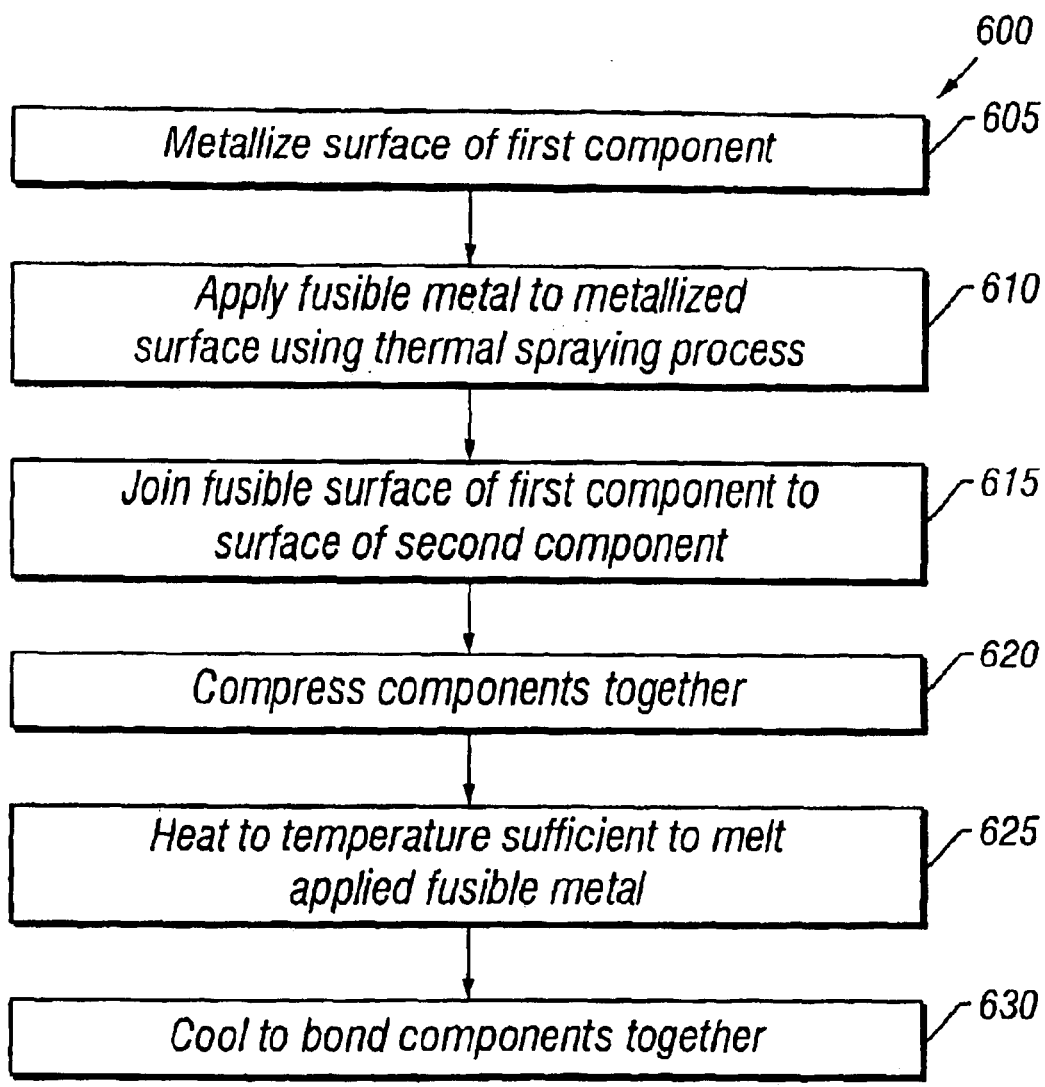
Figure 7:
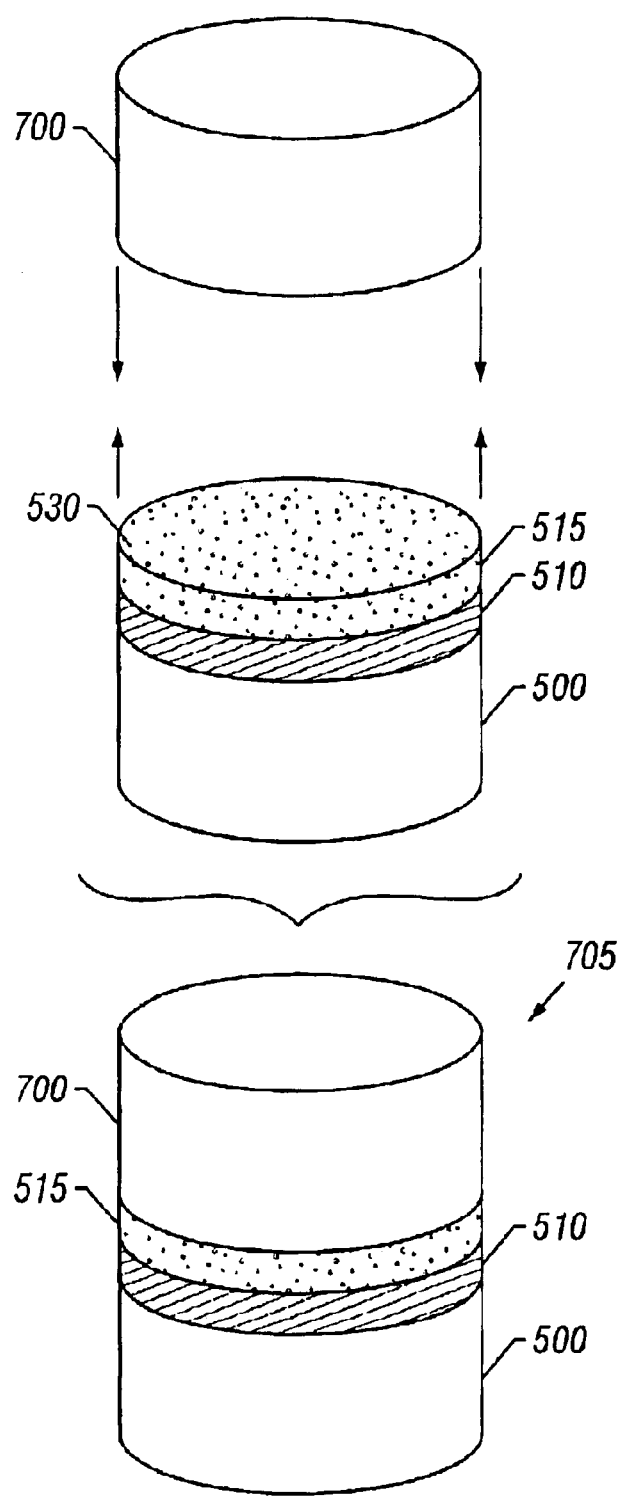
FIG. 7 is a perspective view of preparing the components to be bonded according to the procedure of FIG. 6.

Referring to FIG. 6, the first component 500 may be bonded to a second component 700 (for example, a terminal or MOV) according to a procedure 600, as illustrated in FIG. 7. In this procedure, the surface of the first component 500 is metallized (step 605) using a process detailed above with respect to procedure 400. That is, a thin layer of a surfacing material 510 with a relatively high melting point is applied to the surface of the first component 500 using a thermal spraying technique. Then, a fusible alloy or solder 515 is applied to this metallized surface using a thermal spraying technique as detailed above with respect to procedure 400 (step 610).

A surface 530 of the fusible alloy 515 of the first component 500 is joined with the surface of a second component 700 (step 615). Pressure is applied between the first and second components to keep them together for the next step in the process (step 620). Again, because the first component 500 has already been prepared by metallizing and soldering the surface as discussed above, the first component 500 need not be joined with the second component 700 immediately following the fusible alloy application step.

Once the first component 500 is contacted to the second component 700, the joined components are heated to melt the applied fusible alloy (step 625). For example, the components may be heated to about 235° for about an hour. The components are then cooled to bond the components together (step 630) into a bonded stack 705. In this implementation, the second component may have been prepared for bonding using any of the previously-implemented bonding techniques. Thus, when the stack is heated, the components can bond at the fusible alloy layer.

For example, a layer of the fusible alloy also may be applied to the surface of the second component 700 prior to joining the first component 500 with the second component 700. Alternatively, the second component 700 may he made of a material that is suitable for bonding directly to the fusible alloy layer when heated in step 625.

Other embodiments are within the scope of the following claims. For example, in some implementations, an insulative coating may be bonded to the bonded element stack to prevent the undesired entry of moisture or other contaminants into the module. The coating also may provide increased tensile and mechanical strength to the module, as well as controlled venting of gases during an arrester failure. The insulative coating may cover the circumferential sides of the stack 100 and may be made thin enough to permit the stack to vent gas that may evolve during arrester component failure. In particular, when an MOV 115 or other internal component of the stack fails, pressure within the insulative coating would build as the internal arc burns adjacent materials. The pressure would increase until it reaches a magnitude that causes the insulative coating to burst, so as to relieve the internal pressure and vent the evolved gas. An outer cylindrical surface of a terminal may be knurled, ribbed, or otherwise textured to improve adherence to the insulative coating.

Details regarding formulation of an insulative coating are described in U.S. application Ser. No. 09/142,076, titled "Polymeric Weathershed Surge Arrester and Method" and filed Sep. 1, 1998, and U.S. application Ser. No. 09/432,147, titled "Surge Arrester Module with Bonded Component Stack" and filed Nov. 2, 1999, which are incorporated by reference.

As noted above, the soldering technique may be applied between various components, including other types of varistors and electrical terminals. When the soldering technique is used to join two varistors, solder is applied to both varistor surfaces to be joined according to the procedure of FIG. 4.

What is claimed is:

1. A method of joining an end face of a first electric component to an end face of a second electric component, the method comprising:

applying a metal layer to the end face of the first electric component to form a metallized layer on the end face of the first electric component;

applying a fusible alloy layer to the metallized layer by melting the fusible alloy and propelling the melted fusible alloy to the metallized layer;

after the fusible alloy layer is applied, putting the first and second electric components together such that the fusible alloy layer contacts the end face of the second electric component;

heating the end faces and the fusible alloy layer to melt the fusible alloy layer; and cooling the end faces and the fusible alloy layer to form a bond between the end faces.

2. The method of claim 1, wherein the first electric component comprises a varistor.

3. The method of claim 1, wherein the second electric component comprises a varistor or a terminal.

4. The method of claim 1, wherein melting the fusible alloy includes:

electrically charging two consumable materials of the fusible alloy; and generating an electrical arc between the materials to melt the consumable materials.

5. The method of claim 1, wherein melting the fusible alloy includes creating a plasma spray that heats and melts the fusible alloy.

6. The method of claim 1, wherein applying the metal layer to the end face includes melting the metal and propelling the melted metal to the end face.

7. The method of claim 1, wherein the fusible alloy melts between around 150 and 600° Celsius.

8. The method of claim 1, wherein the fusible alloy layer is applied to the metallized layer without use of flux.

9. The method of claim 1, wherein the metal layer includes brass, copper, aluminum, zinc, steel, tin, nickel, molybdenum, or any combination of brass, copper, aluminum, zinc, steel, tin, nickel and molybdenum.

10. The method of claim 1, wherein the melting point of the metal layer is between around 550° Celsius and 1200° Celsius.

11. The method of claim 1, wherein contacting the fusible alloy layer to the end face of the second electric component includes applying pressure to a second set of end faces of the electric components, the second set of end faces being opposite the end faces to be joined.

12. The method of claim 1, wherein the end face and the fusible alloy layer are heated to about 235° Celsius, and then cooled to form a bond.

13. The method of claim 1, further comprising applying a metal layer to the end face of the second electric component to form a metallized layer on the end face of the second electric component.

14. The method of claim 1 wherein the end faces and the fusible alloy layer are heated after the fusible alloy layer is contacted to the end face of the second electric component.

* * * * *